(12) United States Patent
Enami

(10) Patent No.: US 11,669,450 B2
(45) Date of Patent: Jun. 6, 2023

(54) COMPUTER INCLUDING CACHE USED IN PLURAL DIFFERENT DATA SIZES AND CONTROL METHOD OF COMPUTER

(71) Applicant: FUJITSU LIMITED, Kawasaki (JP)

(72) Inventor: Takashi Enami, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/645,839

(22) Filed: Dec. 23, 2021

(65) Prior Publication Data

US 2022/0292016 A1 Sep. 15, 2022

(30) Foreign Application Priority Data

Mar. 9, 2021 (JP) .............................. JP2021-037318

(51) Int. Cl.
*G06F 12/0802* (2016.01)
*G06F 12/123* (2016.01)
*G06F 12/0842* (2016.01)
*G06F 12/0871* (2016.01)
*G06F 12/084* (2016.01)

(52) U.S. Cl.
CPC ...... *G06F 12/0802* (2013.01); *G06F 2212/60* (2013.01)

(58) Field of Classification Search
CPC ......................... G06F 12/0802; G06F 2212/60
USPC ......................................................... 711/118
See application file for complete search history.

(56) References Cited

U.S. PATENT DOCUMENTS

| 2005/0273568 | A1* | 12/2005 | Blandy ............... G06F 12/0253 711/170 |
| 2008/0104362 | A1* | 5/2008 | Buros ................. G06F 12/1054 711/207 |
| 2012/0096225 | A1* | 4/2012 | Khawand ............ G06F 12/0848 711/119 |
| 2016/0267018 | A1  | 9/2016 | Shimizu et al. |
| 2017/0060737 | A1* | 3/2017 | Iyengar ................. G06F 3/0604 |
| 2017/0228155 | A1  | 8/2017 | Shirota et al. |

FOREIGN PATENT DOCUMENTS

| JP | 2014-010604 A | 1/2014 |
| JP | 2016-170682 A | 9/2016 |
| JP | 2017-138852 A | 8/2017 |

* cited by examiner

*Primary Examiner* — Edward J Dudek, Jr.
*Assistant Examiner* — Sidney Li
(74) *Attorney, Agent, or Firm* — ArentFox Schiff LLP

(57) ABSTRACT

A computer includes a memory and a cache holding a part of data stored in the memory in any of a plurality of data regions. In a case of replacing first data of a first data size held in the cache with second data of a second data size larger than the first data size, allocation of data regions of the cache is changed in units of the second data size by referring to a first management list that includes a plurality of first entries that correspond to the plurality of data regions, respectively, for managing priorities of the data regions for each of the plurality of processes, and a second management list that includes a plurality of second entries corresponding to the first entries for a process that uses the first data size, for managing priorities of first data of the first data size held in the data regions.

6 Claims, 15 Drawing Sheets

FIG. 5

| | |
|---|---|
| CONFIGURATION OUTLINE | BLOCK SIZE: PROCESS A: 4KiB PROCESS B: 16KiB<br>SSD: 1TiB (256Mi=$2^{28}$ BLOCKS): SHARED BY PROCESSES A AND B HALF-AND-HALF<br>HDD: 4TiB (1024Mi=$2^{30}$ BLOCKS)<br>Radix Tree ROOT/NODE/LEAF NUMBER IN EACH LEVEL: 1-$2^6$-$2^{12}$-$2^{18}$-$2^{24}$-$2^{28}$ } NUMBER IN WORST CASE |
| INFORMATION HELD IN RADIX TREE AND CACHE MANAGEMENT INFORMATION | ROOT: ADDRESS OF NODE 4 BYTES x$2^6$<br>NODE: ADDRESS OF CHILD NODE 4 BYTES x$2^6$<br>NODE': ADDRESS OF LEAF OR CACHE METADATA 4 BYTES x$2^6$<br>LEAF: (ADDRESS OF EXTENT MANAGEMENT + CACHE INDEX IN EXTENT) 4 BYTES x$2^4$<br>EXTENT MANAGEMENT: (ADDRESS TO START CACHE METADATA + ADDRESS OF EXTENT MANAGEMENT OF PRECEDING AND SUBSEQUENT PRIORITIES) 12 BYTES<br>CACHE METADATA: (BLOCK ADDRESS OF HDD + ADDRESS OF CACHE METADATA OF PRECEDING AND SUBSEQUENT PRIORITIES) 12 BYTES |
| MEMORY USAGE AMOUNT | WORST CASE (CASE WHERE ACCESS TARGETS ARE UNIFORMLY SCATTERED) : 5.31GiB<br>(BEFORE APPLICATION 7.06GiB)<br>BEST CASE (CASE WHERE ACCESS TARGETS ARE COLLECTED IN ONE-QUARTER REGION) : 3.02GiB<br>(BEFORE APPLICATION 4.02GiB)<br>(REDUCTION BY ABOUT 25% EACH AS COMPARED WITH BEFORE APPLICATION) | ns incorporated herein by reference.

COMPUTER INCLUDING CACHE USED IN PLURAL DIFFERENT DATA SIZES AND CONTROL METHOD OF COMPUTER

CROSS-REFERENCE TO RELATED APPLICATION

This application is based upon and claims the benefit of priority of the prior Japanese Patent Application No. 2021-37318, filed on Mar. 9, 2021, the entire contents of which are incorporated herein by reference.

FIELD

The embodiments discussed herein are related to a computer including a cache used in a plurality of different data sizes and a control method of such computer.

BACKGROUND

In an information processing device, in order to improve access latency of data held in a storage, a method of arranging a plurality of caches of different access speeds in the storage is known. In this type of storage, a capacity of a partition of a high-order cache is determined according to hit information of the cache. In an information processing device including a processor that processes data including a plurality of pages and a plurality of memories of access speeds different from each other, the memory to which the page is moved from the storage is determined according to an access frequency of the page. In an arithmetic processing device including a cache that holds data of a memory a write speed of which is different from a read speed, cache capacities for a read instruction and a write instruction are controlled so that an average memory access time becomes small.

Japanese Laid-open Patent Publications No. 2014-010604, No. 2017-138852, and No. 2016-170682 are disclosed as related art.

SUMMARY

According to an aspect of the embodiments, a computer includes a memory, a cache coupled to the memory and holding a part of data stored in the memory in any of a plurality of data regions, the cache shared by a plurality of processes, and a processor coupled to the memory and configured to execute the plurality of processes that issue access requests of different data sizes, respectively, store data according to the data size for each of the plurality of processes in the cache, access the cache in a case where target data of the access requests is present in the cache, and change, in a case of replacing first data of a first data size held in the cache with second data of a second data size larger than the first data size, allocation of data regions of the cache in units of the second data size by referring to a first management list that includes a plurality of first entries that correspond to the plurality of data regions, respectively, for managing priorities of the data regions for each of the plurality of processes, and a second management list that includes a plurality of second entries corresponding to the first entries for a process that uses the first data size, for managing priorities of first data of the first data size held in the data regions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an illustrative diagram illustrating an example of a usage amount of a memory amount used for cache management in the computer in FIG. 1;

DESCRIPTION OF EMBODIMENTS

In a case where the cache is shared by a plurality of processes, improvement in access efficiency is expected by dynamically changing cache allocation for each process according to an access status. However, a method of avoiding conflict of the cache regions while suppressing an increase in memory amount used for cache management in a case where the cache allocation for each process is dynamically changed has not been proposed.

In one aspect, an object of embodiments is to avoid conflict of cache regions while suppressing an increase in memory amount used for cache management in a case of dynamically changing cache allocation of a plurality of processes of different data sizes of access requests.

Hereinafter, embodiments are described with reference to the drawings.

Figure 1:
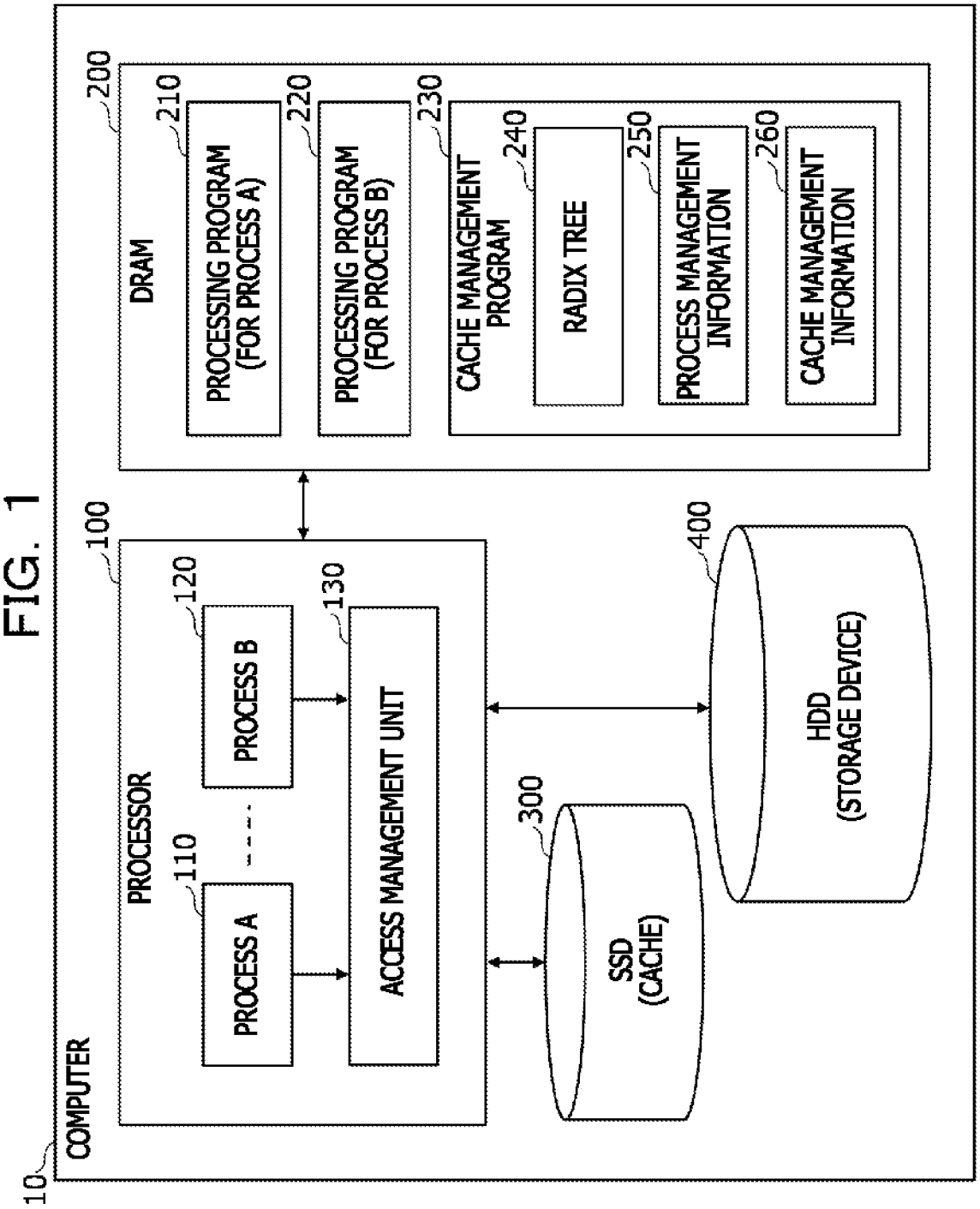
FIG. 1 is a block diagram illustrating an example of a computer in one embodiment.

FIG. 1 illustrates an example of a computer in an embodiment. A computer 10 illustrated in FIG. 1 is, for example, an information processing device such as a server. The computer 10 includes a processor 100, a dynamic random access memory (DRAM) 200, a solid state drive (SSD) 300, and a hard disk drive (HDD) 400. The SSD 300 is an example of a cache capable of holding a part of data stored in the HDD 400 and is shared by a plurality of processes. The HDD 400 is an example of a storage device.

Note that, a memory other than the SSD may be used as the cache, and a memory other than the HDD 400 may be used as the storage device. In this case, a memory at a higher speed than that of the storage device is used as the cache. For example, the HDD 400 may be used as the cache, and an external memory (cloud and the like) on a network connected to the processor 100 may be used in place of the HDD 400 in FIG. 1.

Although not especially limited, in this embodiment, a storage capacity of the HDD 400 is 4 TiB, and a storage capacity of the SSD 300 is 1 TiB. Furthermore, in the HDD 400 and the SSD 300, a block size, which is a minimum unit of data input/output, is 4 KiB (kibibyte).

The processor 100 is, for example, a central processing unit (CPU). The processor 100 is an example of a processing unit that executes a plurality of processes. The processor 100 implements a processing function of a process 110 by executing a processing program 210 stored in the DRAM 200. The processor 100 implements a processing function of a process 120 by executing a processing program 220 stored in the DRAM 200.

Hereinafter, the process 110 is also referred to as a process A, and the process 120 is also referred to as a process B. The processing program 210 is for processing the process A, and the processing program 220 is for processing the process B. In this embodiment, the processor 100 executes the two processes A and B in parallel, but may execute three or more processes in parallel.

Furthermore, the processor 100 implements a function of an access management unit 130 that manages accesses of the SSD 300 and the HDD 400 by executing a cache management program 230 stored in the DRAM 200. In a case where data corresponding to a read access request from each of the processes A and B is in the SSD 300 (cache hit), the access management unit 130 reads the data stored in the SSD 300.

In a case where the data corresponding to the read access request from each of the processes A and B is not in the SSD 300 (cache miss), the access management unit 130 reads data stored in the HDD 400 and writes the read data to the SSD 300. At that time, in a case where there is no free region in the SSD 300, the access management unit 130 evicts data from the SSD 300 and then writes the data read from the HDD 400 to the SSD 300. Although not especially limited, data eviction from the SSD 300 is performed according to least recently used (LRU).

The access management unit 130 writes data received from each of the processes A and B to at least one of the SSD 300 and the HDD 400 in response to a write access request from each of the processes A and B. In a case where the access management unit 130 writes the data only to the HDD 400, this discards old data stored in the SSD 300 corresponding to write data. In the following description, the access request refers to the read access request unless this is especially specified as the write access request. Note that, the access management unit 130 may be provided separately from the processor 100.

Figure 3:
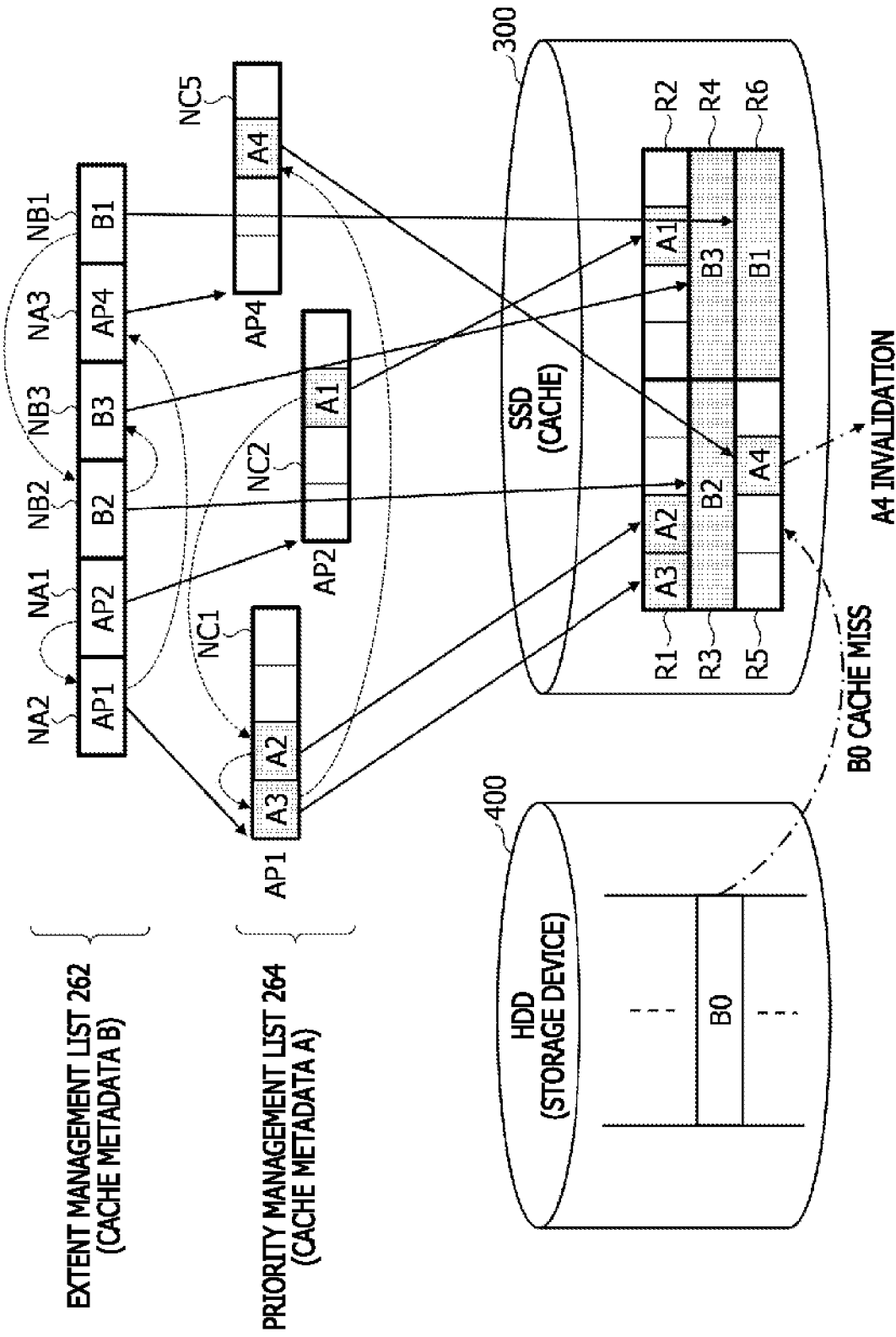
FIG. 3 is an illustrative diagram illustrating an example of an extent management list and a priority management list in FIG. 2.
Figure 4:
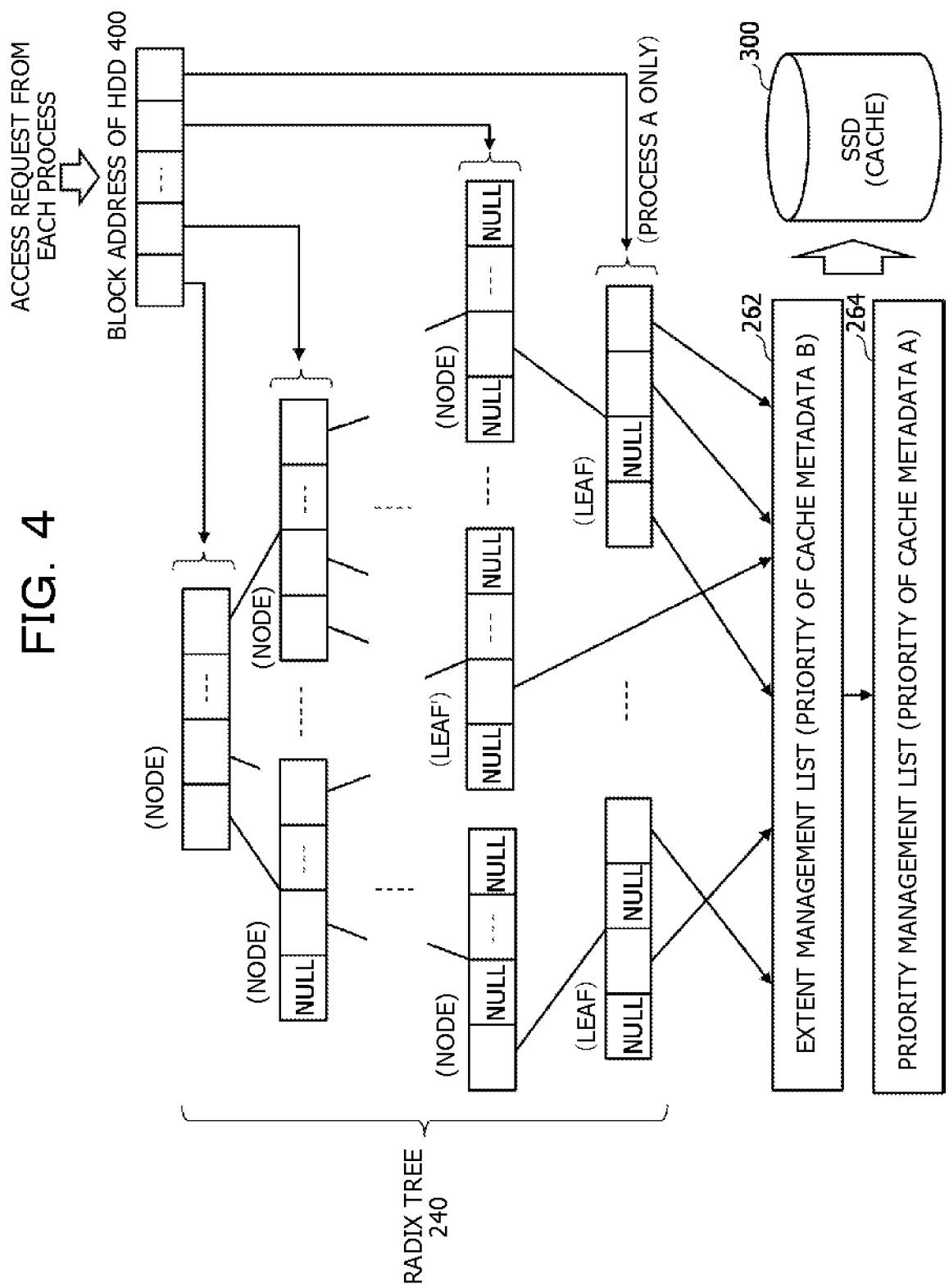
FIG. 4 is an illustrative diagram illustrating an example of cache search by a radix tree in FIG. 1.

The cache management program 230 includes a radix tree 240, process management information 250, and cache management information 260 in addition to a program main body not illustrated. The process management information 250 and the cache management information 260 are illustrated in FIGS. 2 and 3, and the radix tree 240 is illustrated in FIG. 4.

Figure 2:
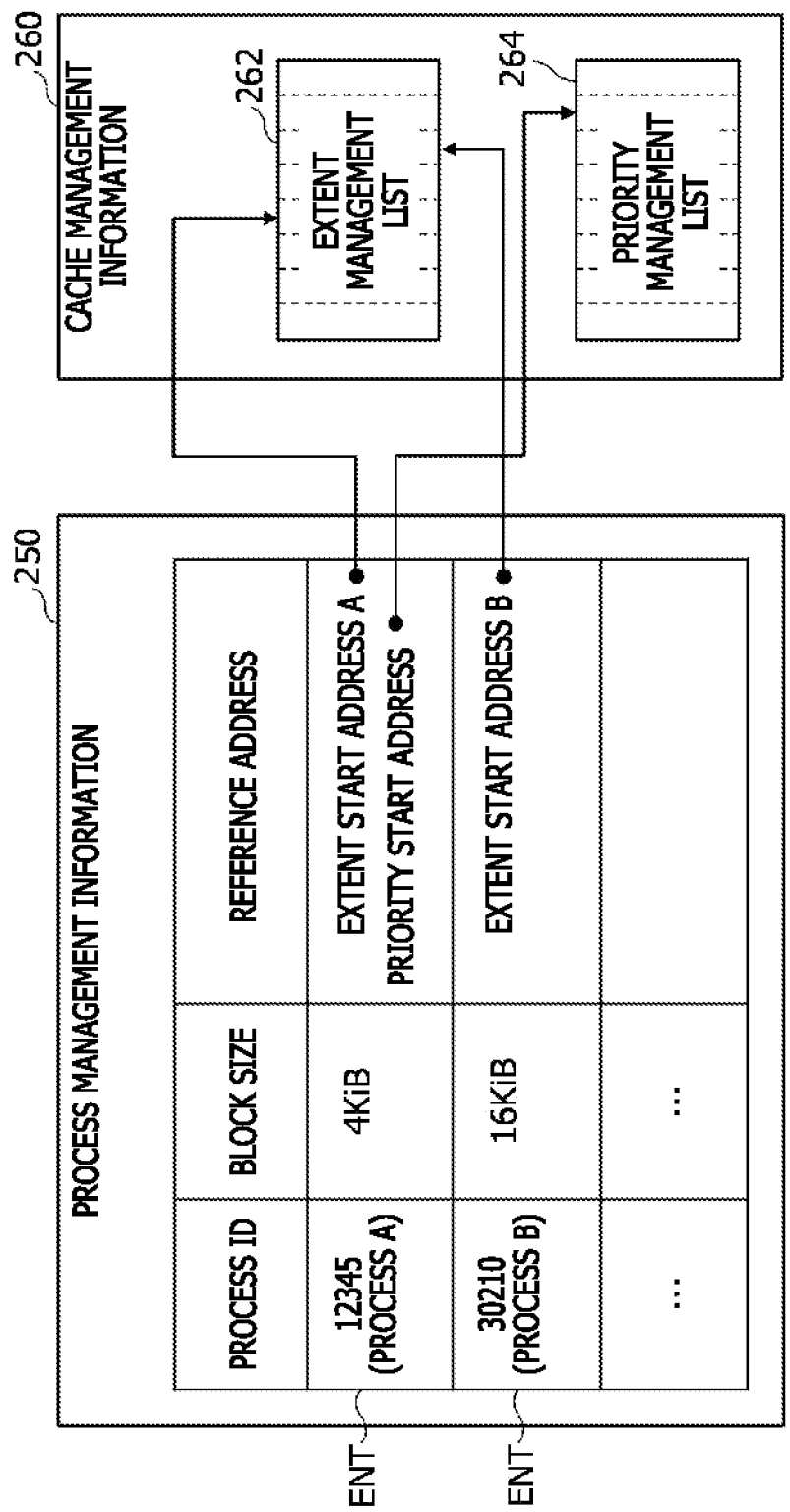
FIG. 2 is an illustrative diagram illustrating an example of process management information and cache management information in FIG. 1.

FIG. 2 illustrates an example of the process management information 250 and the cache management information 260 in FIG. 1. The process management information 250 includes an entry ENT that holds a process identification (ID), a block size, and a reference address for each process executed by the processor 100. In FIG. 2, the process management information 250 includes two entries ENT for the processes A and B. The cache management information 260 includes an extent management list 262 and a priority management list 264 used for managing priorities of data by the LRU. An example of the extent management list 262 and the priority management list 264 is illustrated in FIG. 3.

In the process management information 250, the block size indicates an access unit of data by each of the processes A and B. For example, the process B reads four times as much data as the data read by the process A from the HDD 400 or the SSD 300 for each access request.

In the process management information 250, an extent start address A and a priority start address, and an extent end address A and a priority end address not illustrated, are held in a region of the reference address of the process A. The extent start address A and the extent end address A indicate a position of the priority management list 264 that holds cache metadata of the process A of the highest priority in the extent management list 262. The priority start address and the priority end address indicate a position of the priority management list 264 in which the cache metadata of the highest priority out of the cache metadata of the process A is held.

In the process management information 250, an extent start address B, and an extent end address B not illustrated, are held in a region of the reference address of the process B. The extent start address B and the extent end address B indicate a position of the extent management list 262 in which cache metadata of the highest priority out of the cache metadata of the process B is held. The cache metadata includes position information indicating a storage destination in the SSD 300 of the data used in each of the processes A and B.

FIG. 3 illustrates an example of the extent management list 262 and the priority management list 264 in FIG. 1. The extent management list 262 includes a plurality of nodes corresponding to data regions R (R1 to R6), which are the access units by the process B allocated to the SSD 300, respectively. Each node is used as a node NA for the process A or a node NB for the process B.

In FIG. 3, the nodes NA (NA1, NA2, and NA3) also serve as a bidirectional list for the process A, and the nodes NB (NB1, NB2, and NB3) also serve as a bidirectional list for the process B. The nodes NA and NB are an example of a first entry corresponding to the data region R of the SSD 300, and the bidirectional list including the nodes NA and NB is an example of a first management list.

In the priority management list 264, each node NA of the extent management list 262 holds an addresses AP (AP1, AP2, and AP4) indicating a node NC that holds cache metadata of access target data as the cache metadata for the process A. Furthermore, each node NA of the extent management list 262 holds an index indicating the node NA that holds the cache metadata of higher priority by one and an index indicating the node NA that holds the cache metadata of lower priority by one. Therefore, each node NA may be used for managing the priority of the data region R that holds the data used by the process A.

Each node NB of the extent management list 262 holds the cache metadata indicating a block address of the data region R of the SSD 300. Furthermore, each node NB of the extent management list 262 holds an index indicating the node NB that holds the cache metadata of higher priority by one and an index indicating the node NB that holds the cache metadata of lower priority by one. Therefore, each node NB may be used for managing the priority of the data region R that holds the data used by the process B.

Note that, in FIG. 3, for clarity of the description, it is assumed that the SSD 300 includes six data regions R1 to R6. A storage capacity of each of the data regions R1 to R6 is 16 KiB (four blocks of 4 KiB). In the example illustrated in FIG. 3, the SSD 300 holds data A3 and A2 (4 KiB each) in the data region R1 and holds data A1 (4 KiB) in the data region R2. The SSD 300 holds data B2 and B3 (16 KiB each) in the data regions R3 and R4, respectively. The SSD 300 holds data A4 (4 KiB) in the data region R5 and holds data B1 (16 KiB) in the data region R6. 4 KiB is an example of a first data size, and 16 KiB is an example of a second data size.

Note that the data A (A1 to A4) is an example of first data used in the process A. The data B (B1 to B3) is an example of second data used in the process B. In this manner, the access management unit 130 in FIG. 1 exclusively allocates the data regions according to the data sizes accessed by the processes A and B, that is, the data regions R of the SSD 300 to the processes A and B.

A broken line arrow that connects the nodes NA of the extent management list 262 indicates a link between the nodes NA corresponding to the process A. Furthermore, a broken line arrow that connects the nodes NB of the extent management list 262 indicates a link between the nodes NB corresponding to the process B. In FIG. 3, the node NB1 holds the cache metadata of the data B1 of the highest priority. The node NA1 holds the position AP1 of the priority management list 264 that holds the cache metadata of the data A1 of the highest priority. Note that, the extent start address B illustrated in FIG. 2 indicates the node NB1. The extent start address A illustrated in FIG. 2 indicates the node NA1.

The priority management list 264 includes the node NC (NC2, NC1, and NC5) corresponding to the data regions R that actually hold the data of the process A out of the data regions R1 to R6 of the SSD 300. For this reason, the number of nodes NC of the priority management list 264 changes according to the number of data regions R that hold the data used in the process A.

Each node NC includes four holding regions capable of holding four cache metadata of the process A, respectively. A broken line arrow that connects the holding regions of the priority management list 264 indicates a link of the cache metadata of the process A. In FIG. 3, the node NC2 holds the cache metadata of the data A1 of the highest priority. For this reason, the priority start address A illustrated in FIG. 2 indicates the node NC2.

The four holding regions of each node NC of the priority management list 264 may hold four cache metadata indicating four data regions of 4 KiB of the SSD 300, respectively. Furthermore, the four holding regions of each node NC hold position information of the holding region of the node NC indicating the cache metadata of higher priority by one and position information of the holding region of the node NC indicating the cache metadata of lower priority by one for each cache metadata. The node NC is an example of a second entry corresponding to the data region R of the SSD 300, and the bidirectional list including the node NB is an example of a second management list.

In this embodiment, the nodes NA and NB in the extent management list 262 are provided for each data region R of the SSD 300, which is the access unit (16 KiB) of the process B. For this reason, it is possible to suppress the storage capacity used for the extent management list 262 as compared with a case where the nodes NA and NB are provided for each access unit (4 KiB) of the process A. That is, for example, the priorities of the data region R that holds 16 KiB-data for the process B and the data region R that holds 4 KiB-data for the process A may be managed by one extent management list 262.

Furthermore, the node NC of the priority management list 264 is provided corresponding only to the data region R that holds the data used in the process A. For this reason, the storage capacity used for the priority management list 264 may be reduced as compared with a case where the nodes NC are provided corresponding to all the data regions R1 to R6. Then, the priority management list 264 may manage the priority of individual data used in the process A.

For example, the access management unit 130 in FIG. 1 determines a cache miss in a case where data B0 corresponding to an address indicated in the access request from the process B is not held in the SSD 300. In this case, the access management unit 130 invalidates the data region R5 corresponding to the address AP4 of the lowest priority in order to invalidate the data A4 of the lowest priority out of the data of the process A held by the SSD 300. Then, the access management unit 130 writes data B0 read from the HDD 400 to the data region R5 in which the data A4 is invalidated.

Note that, the access management unit 130 may have an operation mode of invalidating the data of the process different from the process of the cache miss and an operation mode of invalidating the data of the same process as the process of the cache miss in a case where the SSD 300 is full.

FIG. 4 illustrates an example of cache search by the radix tree 240 in FIG. 1. For example, in the radix tree 240, each node holds 64 ($2^6$) addresses. Each leaf holds an address obtained by adding a cache index (any one of 0, 1, 2, and 3) indicating a position of the access target data of the process A to four ($2^2$) addresses of the node NB of the extent management list 262.

In the radix tree 240, the node above the leaf by one level holds the address of the leaf in a case where the node corresponds to the process A. Furthermore, the node above the leaf by one level holds the address of the node NB of the extent management list 262 that holds the cache metadata in a case where the node corresponds to the process B. In the node above the leaf by one level, the node corresponding to the process B is also referred to as a leaf'. NULL indicated in each node, leaf, and leaf' indicates that there is no data of the address corresponding to the block address in the SSD 300. Furthermore, the node, leaf, and leaf' all the addresses of which are NULL are not included in the radix tree 240.

In a case where the access management unit 130 in FIG. 1 receives the access request from each of the processes A and B, the access management unit 130 searches the radix tree 240 using the address included in the access request as the block address of the HDD 400. The search is performed by searching the nodes of the corresponding level of the radix tree 240 in order from a high-order bit group of the block address.

In a case where the address hits NULL, the access management unit 130 determines the cache miss and reads the access target data from the HDD 400. In a case where the address does not hit NULL, and reaches the leaf or leaf', the access management unit 130 determines the cache hit and reads the access target data from the SSD 300. Although not especially limited, for example, the access management unit 130 performs cache management by a fully associative mapping method.

In this embodiment, the leaf is provided corresponding only to the data of the process A present in the SSD 300, and is not provided for the data of the process B. Then, the node above the leaf by one level is used as the leaf' in place of the leaf corresponding to the data of the process B. Therefore, the storage capacity of the DRAM 200 used for the radix tree 240 may be made smaller as compared with a case where the leaf for the process B is provided, for example.

FIG. 5 illustrates an example of a memory usage amount used for cache management in the computer 10 in FIG. 1. Various addresses held by the radix tree 240 and the cache management information 260 are of 4 bytes. For this reason, for example, each node of the radix tree 240 uses 256 bytes for holding $2^6$ addresses. Twelve bytes used for the extent management by the extent management list 262 is a size of each of the nodes NA and NB of the extent management list 262. Similarly, 12 bytes used for the cache metadata is a size of each of the nodes NA and NB of the extent management list 262 and a size of the four holding regions of each node NC of the priority management list 264.

The memory usage amount by the radix tree 240 and the cache management information 260 may be reduced by about 25% in each of a worst case and a best case as compared with that before application of this embodiment. Here, "before application" is a case where the leaf' and the extent management list 262 are not used, and the priority management list in which all the leaves are shared by the processes A and B is used. A basis for calculating the worst case and the best case illustrated in the memory usage amount in FIG. 5 is illustrated in FIG. 6.

Figure 6:
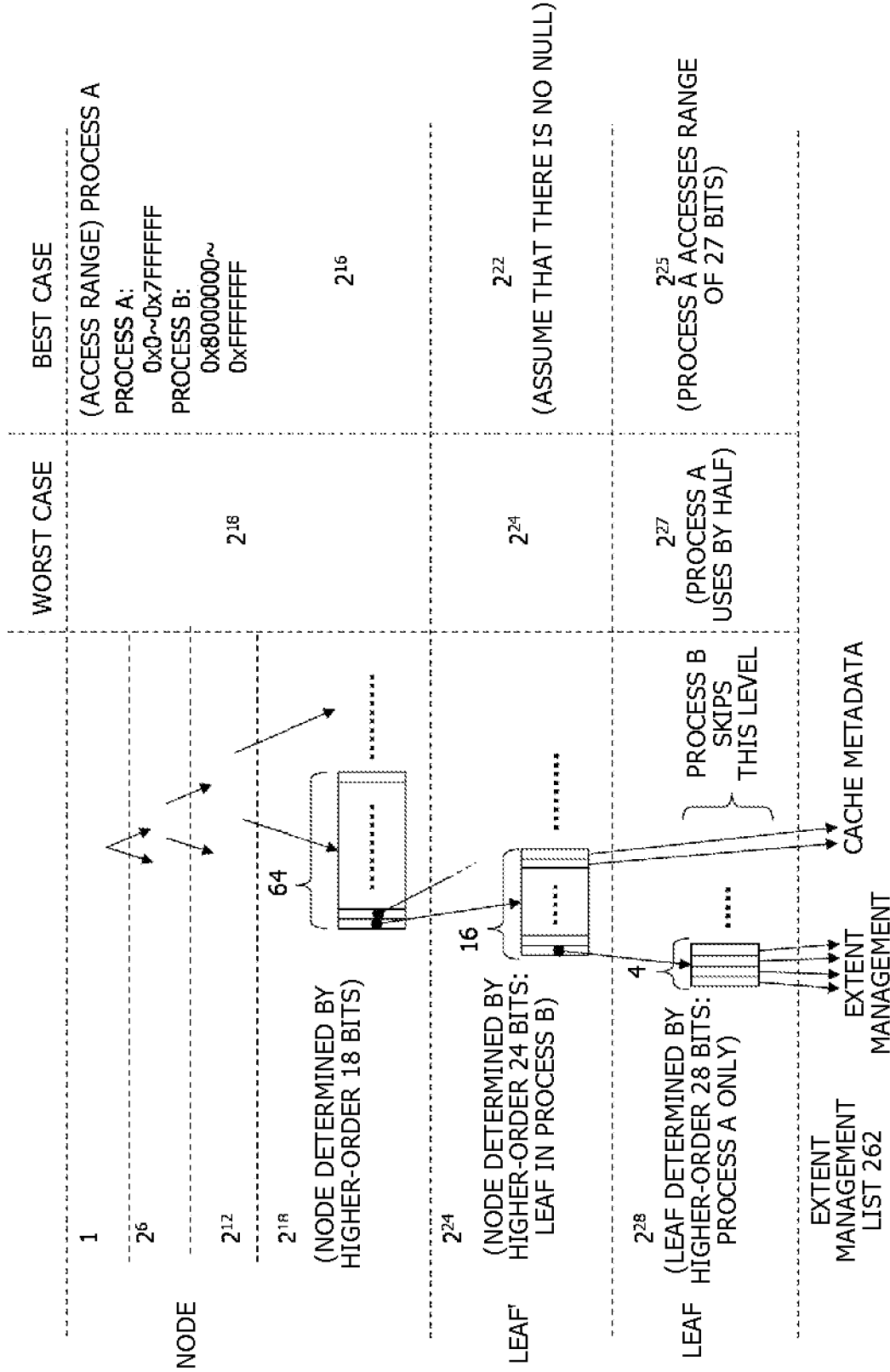
FIG. 6 is an illustrative diagram illustrating an example of a memory amount used in the radix tree in FIG. 1.

FIG. 6 illustrates an example of a memory amount used in the radix tree 240 in FIG. 1. Each node from the start to a fourth level may hold $2^6$ addresses. Each leaf' may hold $2^4$ addresses. Each leaf may hold $2^2$ addresses. In the process B, the leaf is skipped.

Figure 7:
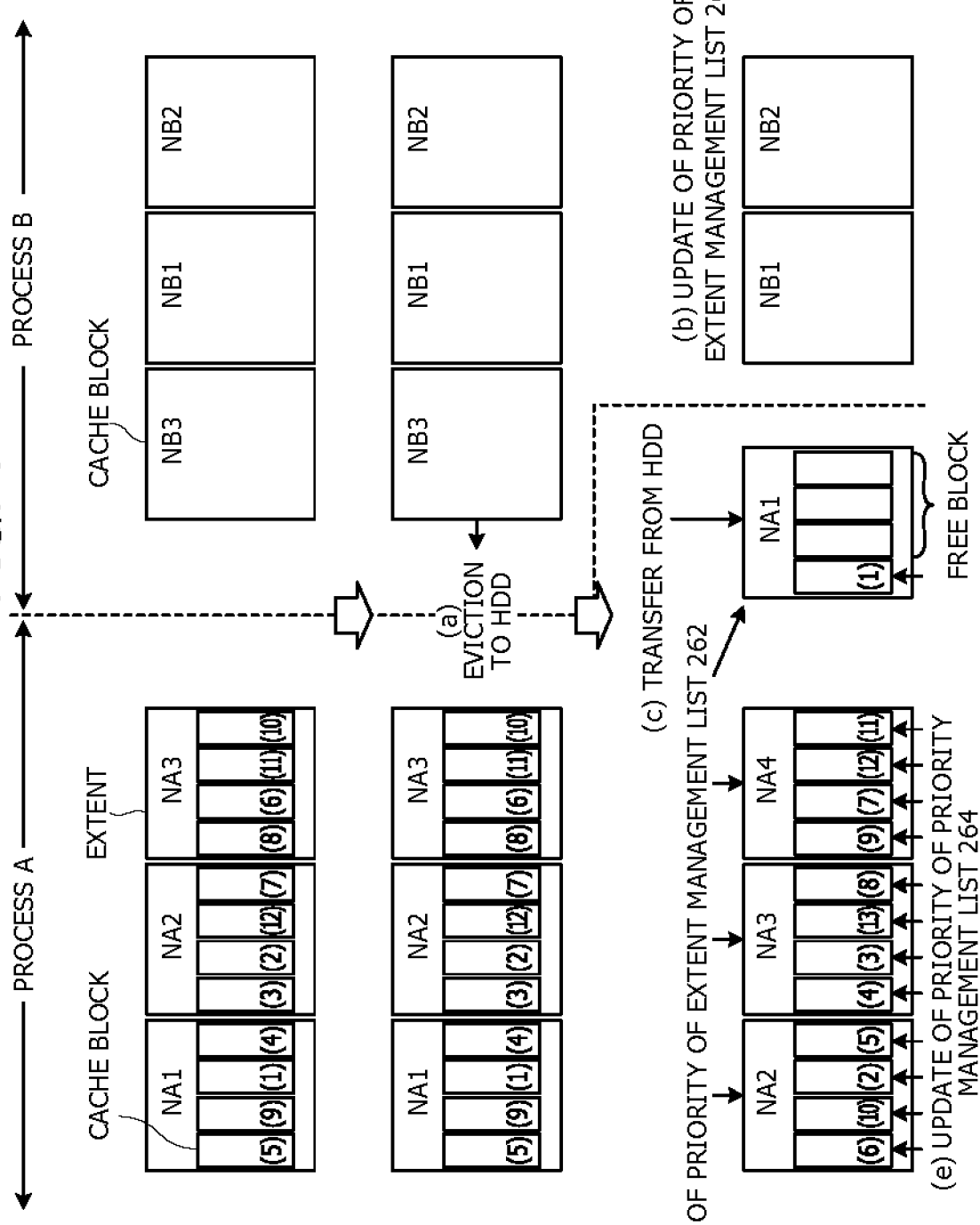
FIG. 7 is an illustrative diagram illustrating an example of an operation when an access request from a process A results in cache miss in the computer in FIG. 1.

FIG. 7 illustrates an example of an operation when the access request from the process A results in the cache miss in the computer 10 in FIG. 1. In other words, for example, FIG. 7 illustrates an example of a control method of the computer 10. In FIG. 7, for clarity of the description, it is assumed that the SSD 300 includes the six data regions R1 to R6 as in FIG. 3, and used by the processes A and B half-and-half. Furthermore, it is assumed that each of the processes A and B issues only the read access request, and the access management unit 130 manages the priority by the LRU. Note that, in FIG. 7, there is a case where the nodes NA and NB are illustrated as the data regions R of the SSD 300.

A size of a cache block of the process A is one-quarter of a size of a cache block of the process B. In the process A, the access management unit 130 manages the priority of the extent management list 262 and the priority of the priority management list 264. In the process B, the access management unit 130 manages the priority of the extent management list 262.

In the process A, an extent corresponds to each node NA of the extent management list 262, and a number of the node NA indicates the priority of each node NA in the process A of the extent management list 262. In the process A, the cache block corresponds to each cache metadata of the priority management list 264, and a number assigned to the cache block indicates the priority of the cache metadata of the priority management list 264. The priority of the priority management list 264 applies only to the process A.

In the process B, the cache block corresponds to each node NB of the extent management list 262, and a number of the node NB indicates the priority of each node NB in the process B of the priority management list 264.

Note that, as for the various priorities described above, the smaller the value, the higher the priority, indicating that a time written to the SSD 300 is the latest.

In FIG. 7, the access request from the process A results in the cache miss, and the access management unit 130 evicts the cache block of the lowest priority out of the cache blocks of the process B held in the SSD 300 to the HDD 400 (FIG. 7(*a*)). The access management unit 130 sets the node NB3 corresponding to the evicted cache block to free. Note that, in a case where the cache block to be evicted is not updated, the access management unit 130 invalidates the cache block and this need not evict the same to the HDD 400. The access management unit 130 updates the priority of the node NB corresponding to the process B in the extent management list 262 (FIG. 7(*b*)).

Next, the access management unit 130 writes the data read from the HDD 400 in response to the access request from the process A to a free region in the SSD 300 (FIG. 7(*c*)). Since the size of the cache block of the process A is one-quarter of the size of the cache block of the process B, three-quarters become a free block.

The access management unit 130 updates the priority of the extent management list 262 corresponding to the process A (FIG. 7(*d*)). For example, the access management unit 130 sets the priority of the node NA corresponding to the data region R of the SSD 300 to which the data is written the highest in the nodes NA of the extent management list 262, and reduces the priorities of other nodes NA for the process A by one.

Furthermore, the access management unit 130 updates the priority of the priority management list 264 (FIG. 7(*e*)). For example, the access management unit 130 sets the priority of the node NC (corresponding to the node NA1) corresponding to the data region R to which the data from the HDD 400 is transferred the highest in the priority management list 264. Furthermore, the access management unit 130 sets the priority of the data transferred from the HDD 400 the highest, and reduces the priorities of other data of the process A already held in each data region by one.

By the above-described operation, in a case where the SSD 300 is shared by a plurality of processes A and B of different block sizes, it is possible to dynamically change the allocation of the data regions R while avoiding conflict of the data regions R of the SSD 300. Note that an update order of the extent management list 262 and the priority management list 264 may be different from the above-described order.

Figure 8:
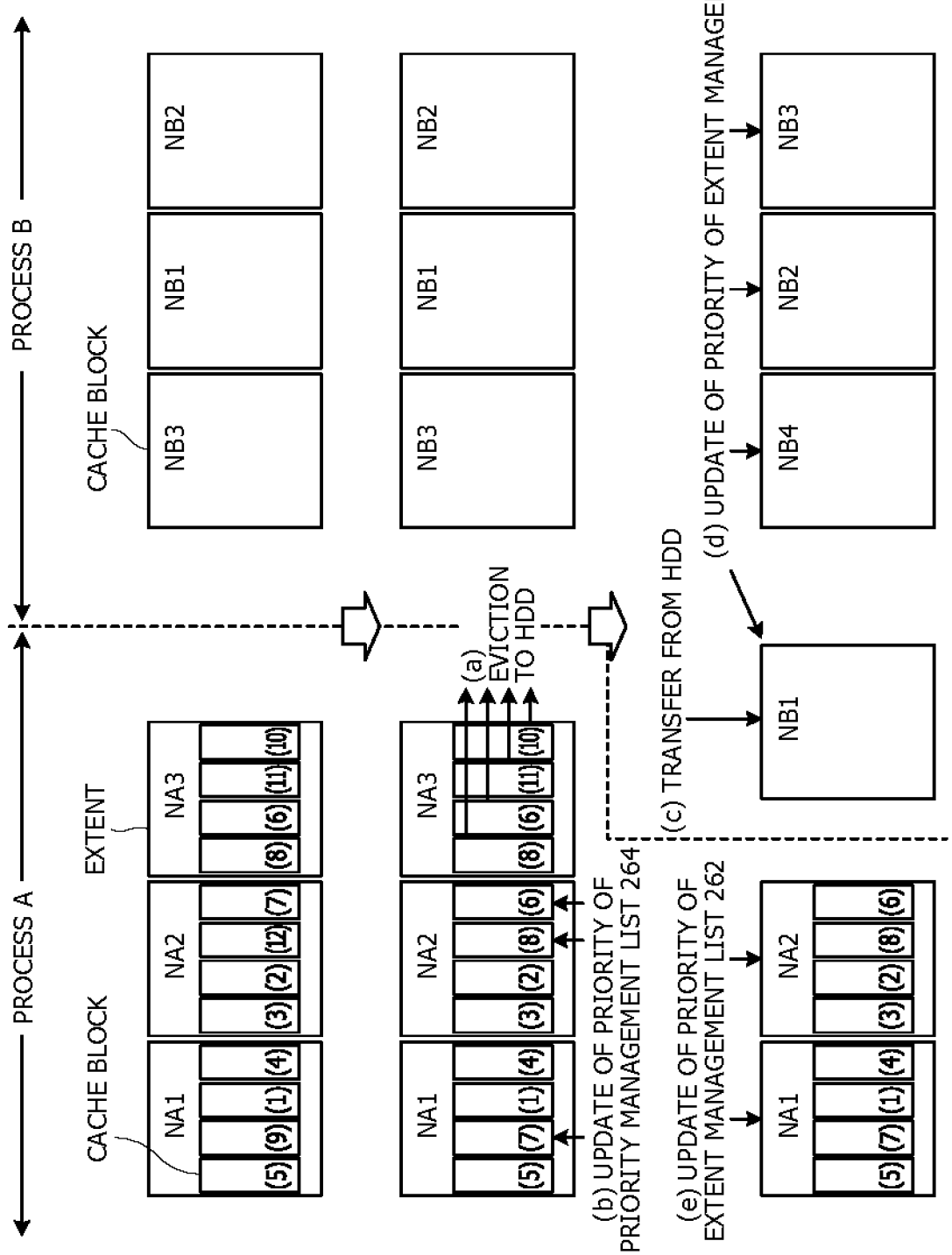
FIG. 8 is an illustrative diagram illustrating an example of an operation when an access request from a process B results in cache miss in the computer in FIG. 1.

FIG. 8 illustrates an example of an operation when the access request from the process B results in the cache miss in the computer 10 in FIG. 1. In other words, for example, FIG. 8 illustrates an example of the control method of the computer 10. As for the elements and operations similar to those in FIG. 7, detailed description is not repeated. A condition of the operation is the same as the condition of the operation illustrated in FIG. 7, and an initial state is the same as that in FIG. 7. Note that, in FIG. 8 also, there is a case where the nodes NA and NB are described as the data regions R of the SSD 300.

In FIG. 8, the access request from the process B results in the cache miss, and the access management unit 130 evicts four data including data of the lowest priority out of the cache blocks of the process A held in the SSD 300 to the HDD 400 (FIG. 8(a)). Here, the four data to be evicted are the data held in the data region R corresponding to the node NC of the lowest priority. Note that, in a case where the data to be evicted from the SSD 300 to the HDD 400 are not updated, the access management unit 130 may invalidate the data held in the SSD 300.

Therefore, even in a case where the data sizes of the processes A and B are different from each other, it is possible to secure the data region R that stores the data B read from the HDD 400 on the basis of the access request from the process B in the SSD 300. At that time, it is possible to suppress the four data A of various priorities held in the SSD 300 from being lost. Furthermore, the access management unit 130 evicts the data of the lowest priority out of the data held in the SSD 300 for use in the process A. In an LRU method, the data of the lowest priority is least recently accessed data. For this reason, even in a case where the data of the process A is evicted from the SSD 300, deterioration in data access efficiency by the process A may be made minimum.

Next, the access management unit 130 updates the priority of the priority management list 264 (FIG. 8(b)). For example, the access management unit 130 reorders the priorities of the data held in the SSD 300 corresponding to the process A by sequentially closing vacant priorities due to eviction of the data in the priority management list 264.

Next, the access management unit 130 writes the data transferred from the HDD 400 in response to the access request from the process B to a free region in the SSD 300 (FIG. 8(c)). Furthermore, the access management unit 130 updates the priority of the extent management list 262 related to the process B (FIG. 8(d)). For example, the access management unit 130 sets the priority of the node NB corresponding to the data region R of the SSD 300 to which the data is written the highest out of the nodes NB of the extent management list 262, and reduces the priorities of other nodes NB for the process B by one. Furthermore, the access management unit 130 updates the priority of the extent management list 262 corresponding to the process A (FIG. 8(e)). Note that an update order of the extent management list 262 and the priority management list 264 may be different from the above-described order.

As described above, in this embodiment, in a case where the SSD 300 (cache) is shared by a plurality of processes A and B of different data sizes of the access requests, it is possible to dynamically change the allocation of the data regions R while avoiding conflict of the data regions R of the SSD 300. At that time, by using the leaf of the radix tree 240 only for reference of the cache metadata of the process A, it is possible to avoid the conflict of the data regions R while suppressing an increase in memory amount used for managing the cache.

Since the eviction of the data A from the SSD 300 is executed in units of the data region R, in a case where the data region R that stores the data B stored in the HDD 400 is secured in the SSD 300, it is possible to suppress the data A held in the SSD 300 from being lost. The nodes NA and NB of the extent management list 262 are provided for each data region R, which is the access unit of the process B. For this reason, the storage capacity of the DRAM 200 used for the extent management list 262 may be suppressed as compared with a case where the nodes NA and NB are provided for each access unit of the process A.

The node NC of the priority management list 264 is provided corresponding only to the data region R that holds the data used in the process A. For this reason, the storage capacity of the DRAM 200 used for the priority management list 264 may be reduced as compared with a case where the nodes NC are provided corresponding to all the data regions R1 to R6.

Furthermore, the access management unit 130 evicts the data A of the lowest priority out of the data A of the process A held in the SSD 300 according to the LRU method. Therefore, also in a case where the data A of the process A is evicted from the SSD 300, deterioration in data access efficiency due to the process A may be made minimum.

Figure 9:
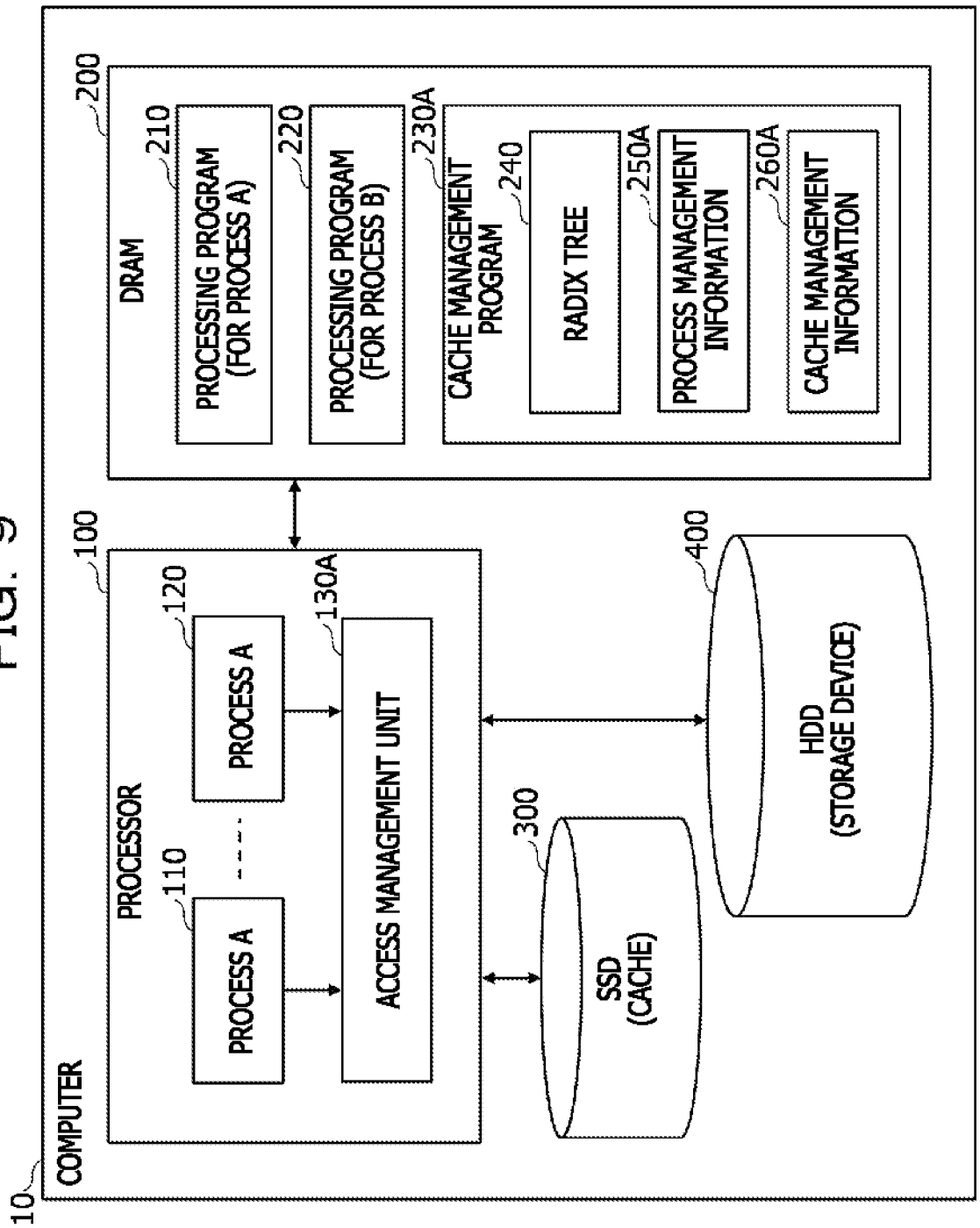
FIG. 9 is a block diagram illustrating an example of a computer in another embodiment.

FIG. 9 illustrates an example of a computer in another embodiment. Elements similar to those in FIG. 1 are denoted by the same reference signs, and detailed description thereof is omitted. A computer 10 illustrated in FIG. 9 includes an access management unit 130A in place of the access management unit 130 in FIG. 1, and includes a cache management program 230A in place of the cache management program 230 in FIG. 1. The cache management program 230A includes process management information 250A and cache management information 260A in place of the process management information 250 and the cache management information 260 in FIG. 1, respectively. Other configurations and functions of the computer 10 in FIG. 9 are similar to those of the computer 10 in FIG. 1.

Figure 10:
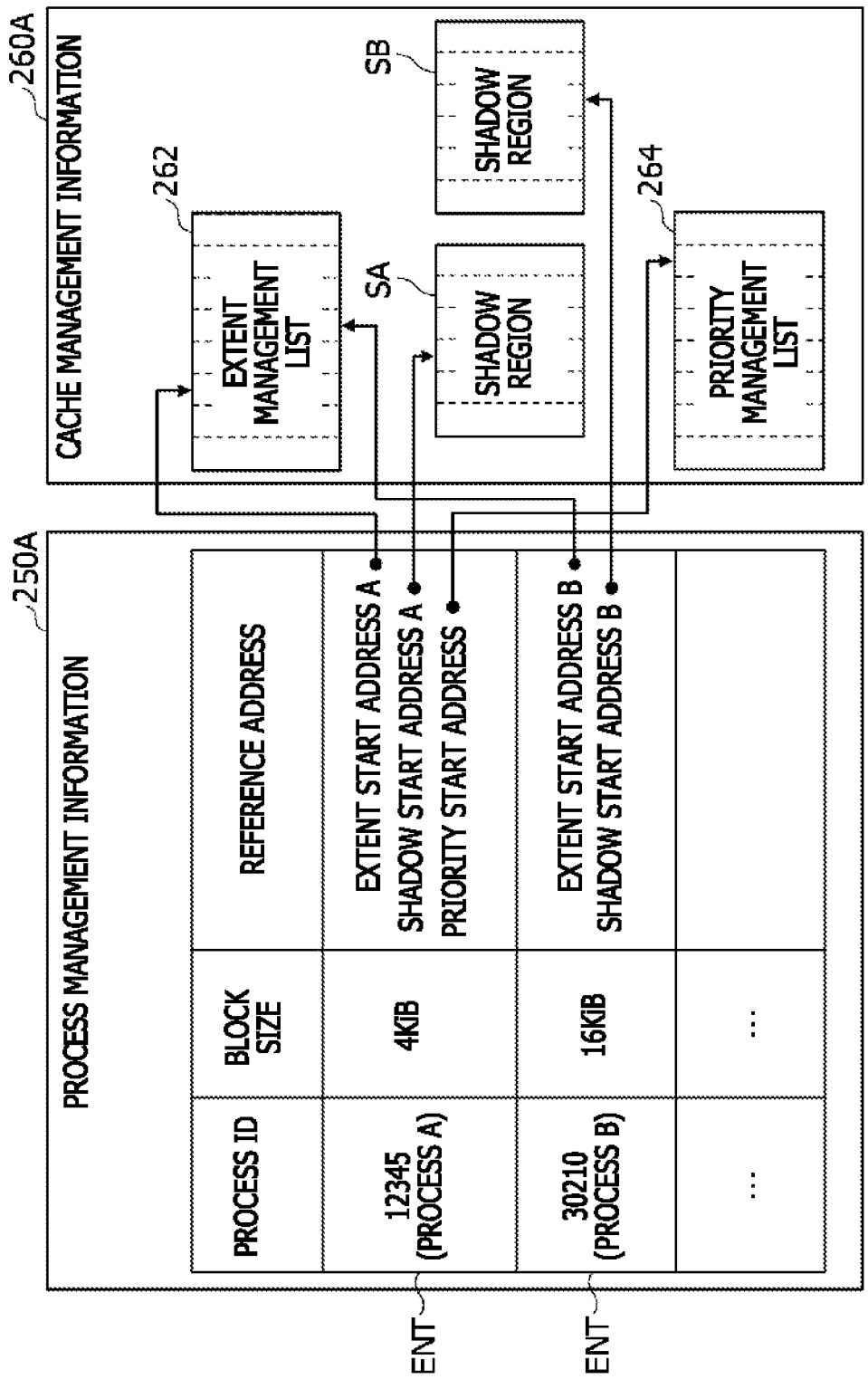
FIG. 10 is an illustrative diagram illustrating an example of process management information and cache management information in the computer in FIG. 9.

FIG. 10 illustrates an example of the process management information 250A and the cache management information 260A in the computer 10 in FIG. 9. Detailed description of elements similar to those in FIG. 2 is not repeated. In this embodiment, the cache management information 260A includes a shadow region SA for a process A and a shadow region SB for a process B in addition to the extent management list 262 and the priority management list 264 in FIG. 2.

Figure 11:
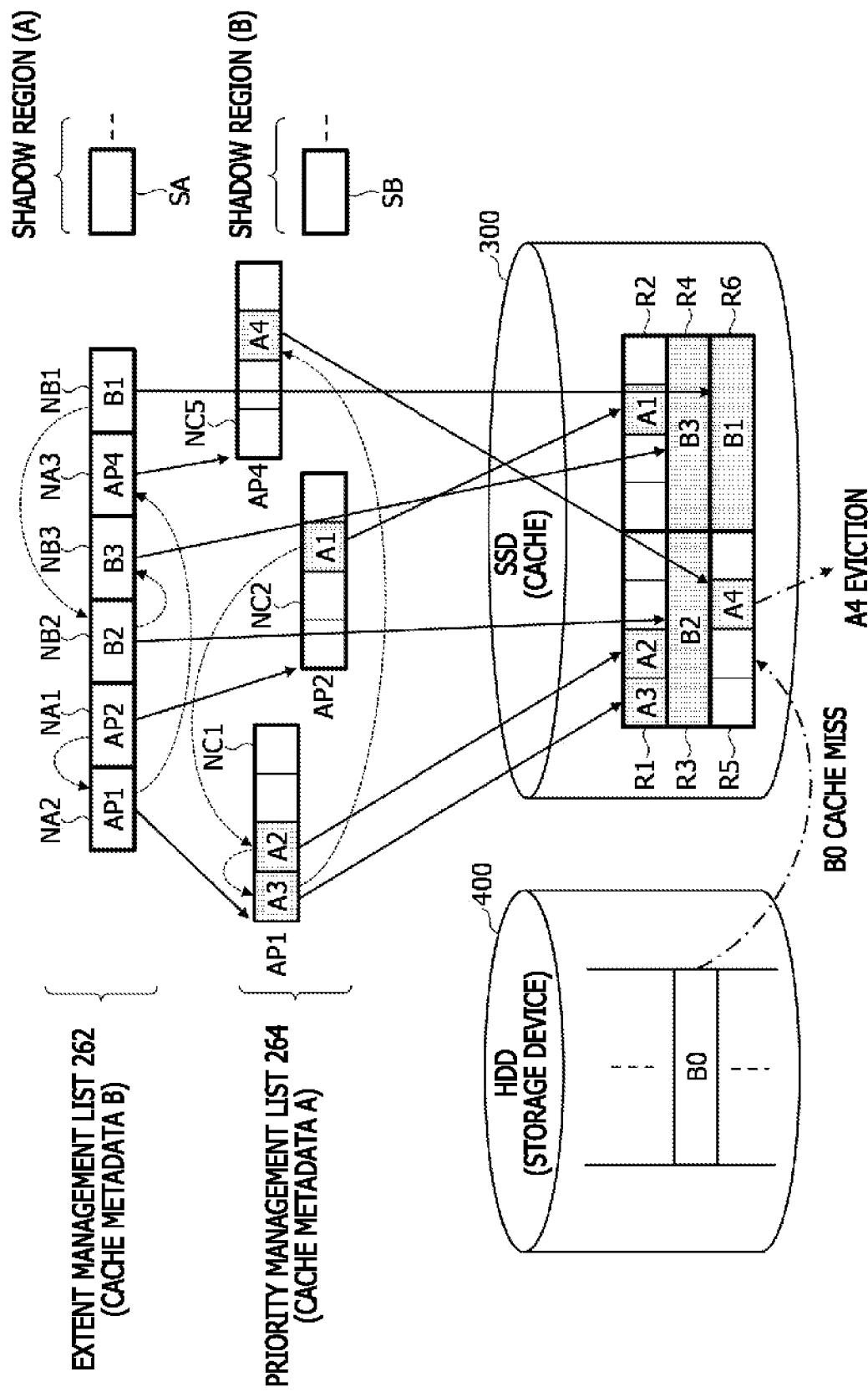
FIG. 11 is an illustrative diagram illustrating an example of an extent management list and a priority management list in FIG. 10.

The shadow regions SA and SB are illustrated in FIG. 11. In addition to the process management information 250 in FIG. 2, the process management information 250A includes shadow start addresses A and B, and shadow end addresses A and B not illustrated, for the processes A and B, respectively, as reference addresses.

FIG. 11 illustrates an example of the extent management list 262 and the priority management list 264 in FIG. 10. Detailed description of the elements similar to those in FIG. 3 is not repeated. The priority management list 264 is the same as that in FIG. 3. Furthermore, in FIG. 11 also, for clarity of the description, it is assumed that an SSD 300 includes six data regions R1 to R6.

In the extent management list 262, nodes NA1 to NA3 and NB1 to NB3 are similar to the nodes NA1 to NA3 and NB1 to NB3 in FIG. 3. The shadow region SA is used for holding information regarding cache metadata held in the node NA of the lowest priority in a case where an address of the process B held in the shadow region SB results in cache hit or an address of the process A results in cache miss. The shadow region SA is an example of an eviction address list corresponding to the node NA. Here, the information regarding the cache metadata includes a block address of a HDD 400 included in an access request from the process A that results in the cache miss.

The shadow region SB is used for holding information regarding cache metadata held in the node NB of the lowest priority in a case where an address of the process A held in the shadow region SA results in cache hit or an address of the process B results in cache miss. The shadow region SB is an example of an eviction address list corresponding to the node NB.

Note that information of a radix tree 240 corresponding to the cache metadata held in the shadow regions SA and SB is held. For this reason, in a case where the block address included in the access request is included in either the shadow region SA or SB, an operation based on the cache hit is performed.

However, in a case where the cache metadata is moved to the shadow regions SA and SB, the corresponding data in the SSD 300 is invalidated or evicted from the SSD 300. Therefore, the SSD 300 does not hold the data corresponding to the block address included in the shadow regions SA and SB. A manner of using the shadow regions SA and SB is illustrated in FIGS. 12 to 15.

Figure 12:
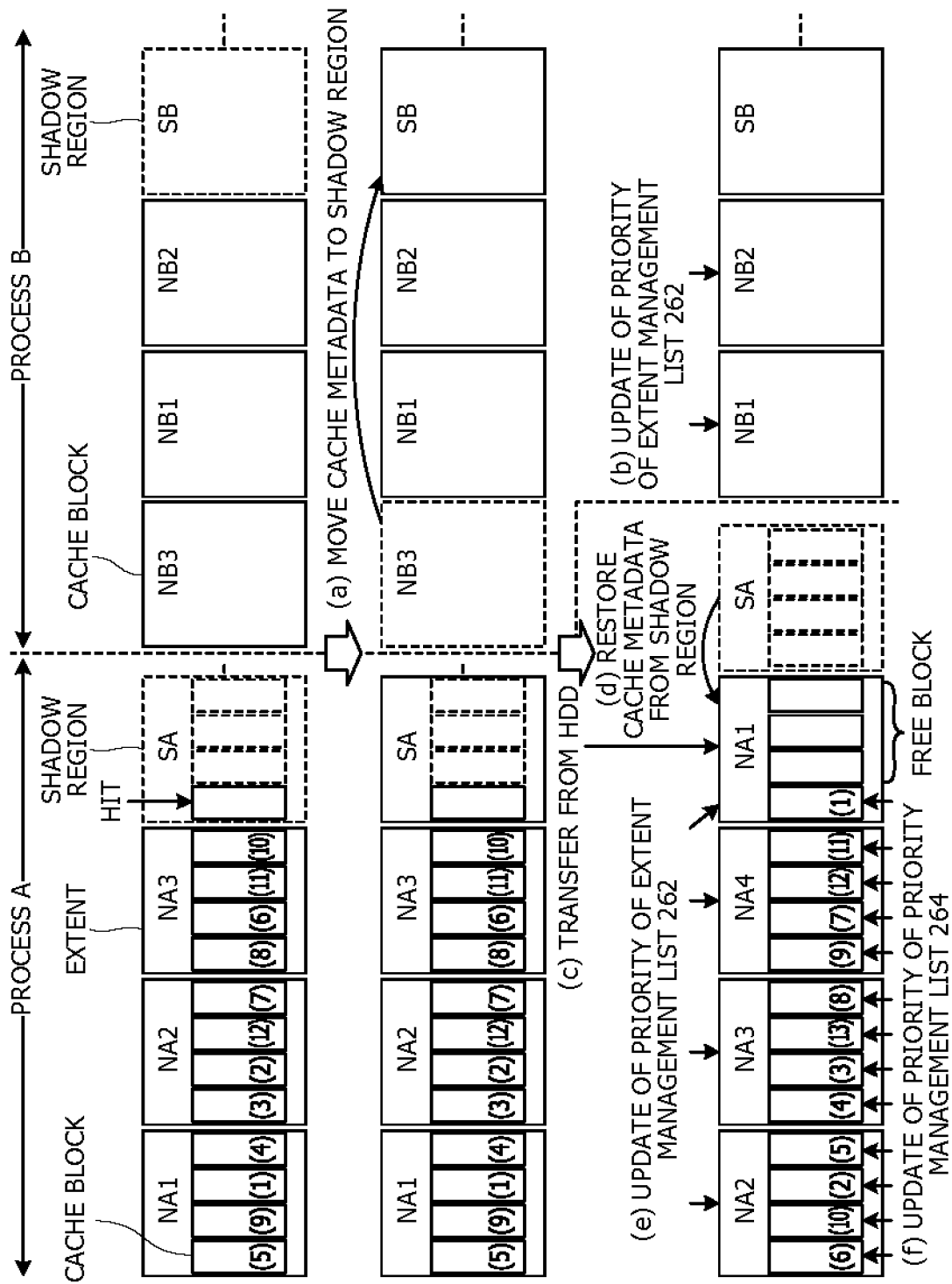
FIG. 12 is an illustrative diagram illustrating an example of an operation when an access request from a process A hits in a shadow region in the computer in FIG. 9.

FIG. 12 illustrates an example of an operation when the access request from the process A hits in the shadow region SA in the computer 10 in FIG. 9. In other words, for example, FIG. 12 illustrates an example of a control method of the computer 10 in FIG. 9. As for the elements and operations similar to those in FIG. 7, detailed description is not repeated. A condition of the operation is the same as the condition of the operation illustrated in FIG. 7, and an initial state is similar to that in FIG. 7 except for including the shadow regions SA and SB. Note that, as illustrated in FIG. 10, the shadow regions SA and SB are managed independently of the extent management list 262. In FIG. 12 also, there is a case where the nodes NA and NB are illustrated as the data regions R of the SSD 300.

In FIG. 12, the cache metadata is held in one shadow region SA in the initial state. The shadow regions SA and SB indicated by solid lines are associated by the radix tree 240, indicating that they are effective. The shadow regions SA and SB indicated by broken lines are not associated by the radix tree 240, indicating that they are invalid.

Note that, as illustrated in FIG. 4, the cache miss is determined in a case of hitting a node, a leaf, or a leaf' in which NULL is set when searching for an address by the radix tree. In the example illustrated in FIGS. 12 to 14, NULL is set in a case where the address is not present in the extent management list 262 or the priority management list 264 and is not present in the shadow region SA (or SB). For this reason, hereinafter, a case where the address is present in the shadow region SA (or SB) is also treated as the cache hit.

In this example, the access request from the process A results in the cache miss, and the cache metadata of the cache miss is registered in the shadow region SA (cache hit of the shadow region SA). In this case, the access management unit 130A moves the cache metadata from the node NB of the lowest priority to the shadow region SB (FIG. 12(*a*)). Furthermore, the access management unit 130A evicts the data from the data region R of the SSD 300 corresponding to the cache metadata moved to the shadow region SB. Then, the access management unit 130A updates the priority of the node NB of the extent management list 262, and sets the node NB from which the cache metadata is moved to be free (FIG. 12(*b*)).

Next, the access management unit 130A writes the data transferred from the HDD 400 in response to the access request from the process A (hit in the shadow region SA) to a free data region R of the SSD 300 (FIG. 12(*c*)). The access management unit 130A moves the cache metadata from the shadow region SA to the node NA corresponding to the data region R of the SSD 300 to which the data is written, thereby restoring the same (FIG. 12(*d*)). By moving the cache metadata, the cache metadata of the shadow region SA is deleted.

Then, the access management unit 130A updates the priority of the node NA of the extent management list 262 (FIG. 12(*e*)). Furthermore, the access management unit 130A updates the priority of the priority management list 264 (FIG. 12(*f*)). Note that an update order of the extent management list 262 and the priority management list 264 may be different from the above-described order.

Note that, it is assumed that the access request of the process A corresponding to the cache metadata that is not present in the shadow region SA results in the cache miss. In this case, the access management unit 130A moves the cache metadata of the data of the lowest priority in the priority management list 264 to the shadow region SA in the process A. Furthermore, the access management unit 130A evicts the data from the data region R of the SSD 300 corresponding to the cache metadata moved to the shadow region SA. Then, the access management unit 130A reads the data of the cache miss from the HDD 400 and writes the same to the SSD 300, and updates the priority of the extent management list 262 and the priority of the priority management list 264.

Figure 13:
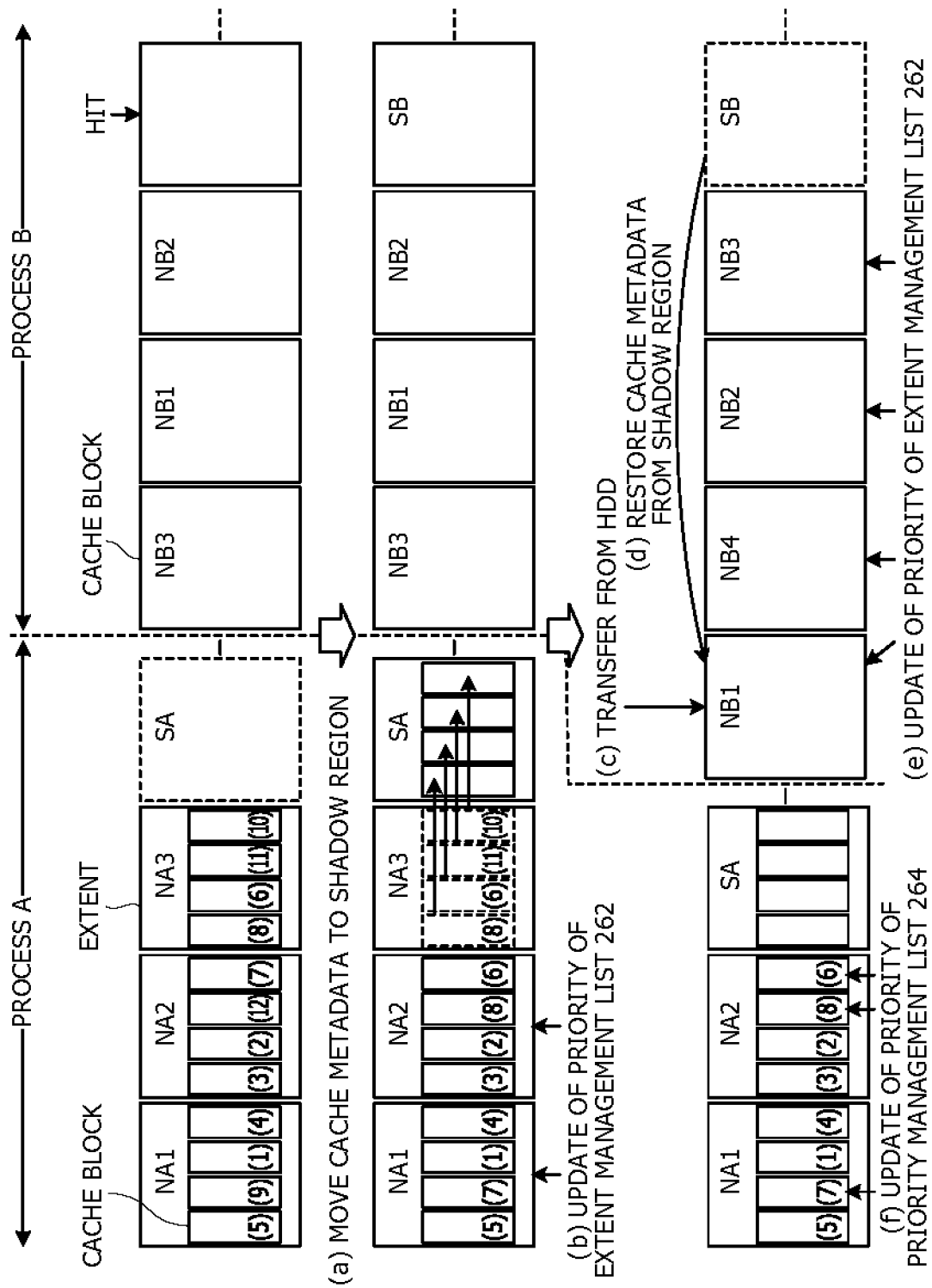
FIG. 13 is an illustrative diagram illustrating an example of an operation when an access request from a process B hits in a shadow region in the computer in FIG. 9.

FIG. 13 illustrates an example of an operation when the access request from the process B hits in the shadow region in the computer 10 in FIG. 9. In other words, for example, FIG. 13 illustrates an example of the control method of the computer 10 in FIG. 9. As for the elements and operations similar to those in FIGS. 8 and 12, detailed description is not repeated. A condition of the operation is the same as the condition of the operation illustrated in FIGS. 7 and 8, and the initial state is similar to that in FIG. 8 except for including the shadow regions SA and SB. In FIG. 13 also, there is a case where the nodes NA and NB are illustrated as the data regions R of the SSD 300.

In FIG. 13, the cache metadata is held in one shadow region SB. In this example, the access request from the process B results in the cache miss, and the cache metadata of the cache miss is registered in the shadow region SB (cache hit of the shadow region SB). In this case, the access management unit 130A moves the cache metadata of the node NA of the lowest priority from the node NA to the shadow region SA (FIG. 13(*a*)).

Furthermore, the access management unit 130A evicts the data from the data region R of the SSD 300 corresponding to the cache metadata moved to the shadow region SA. Then, the access management unit 130A updates the priority of the node NA of the extent management list 262, and sets the node NA from which the cache metadata is moved to be free (FIG. 13(*b*)).

Next, the access management unit 130A writes the data transferred from the HDD 400 in response to the access request from the process B, that is hit in the shadow region SB, to the free region of the SSD 300 (FIG. 13(*c*)). The access management unit 130A moves the cache metadata from the shadow region SB to the node NB corresponding to the data region R of the SSD 300 to which the data is written, thereby restoring the same (FIG. 13(*d*)). By moving the cache metadata, the cache metadata of the shadow region SB is deleted.

Then, the access management unit 130A updates the priority of the extent management list 262 corresponding to the process B (FIG. 13(*e*)). Furthermore, the access management unit 130A updates the priority of the priority management list 264 (FIG. 13(*f*)); note that an update order of the extent management list 262 and the priority management list 264 may be different from the above-described order.

As described above, by the operation illustrated in FIGS. 12 and 13, in a case where the SSD 300 is shared by a plurality of processes A and B of different block sizes, it is possible to dynamically change the allocation of the data regions R while avoiding conflict of the data regions R of the SSD 300 by using the shadow regions SA and SB.

Note that, it is assumed that the access request of the process B corresponding to the cache metadata that is not present in the shadow region SB results in the cache miss. In this case, the access management unit 130A moves the cache metadata of the node NB of the lowest priority out of the nodes NB of the extent management list 262 to the shadow region SB, and sets the node NB to be free. Furthermore, the access management unit 130A evicts the data from the data region R of the SSD 300 corresponding to the cache metadata moved to the shadow region SB. Then, the access management unit 130A reads the data of the cache miss from the HDD 400 and writes the same to the SSD 300, and updates the priority of the extent management list 262 and the priority of the priority management list 264.

Figure 14:
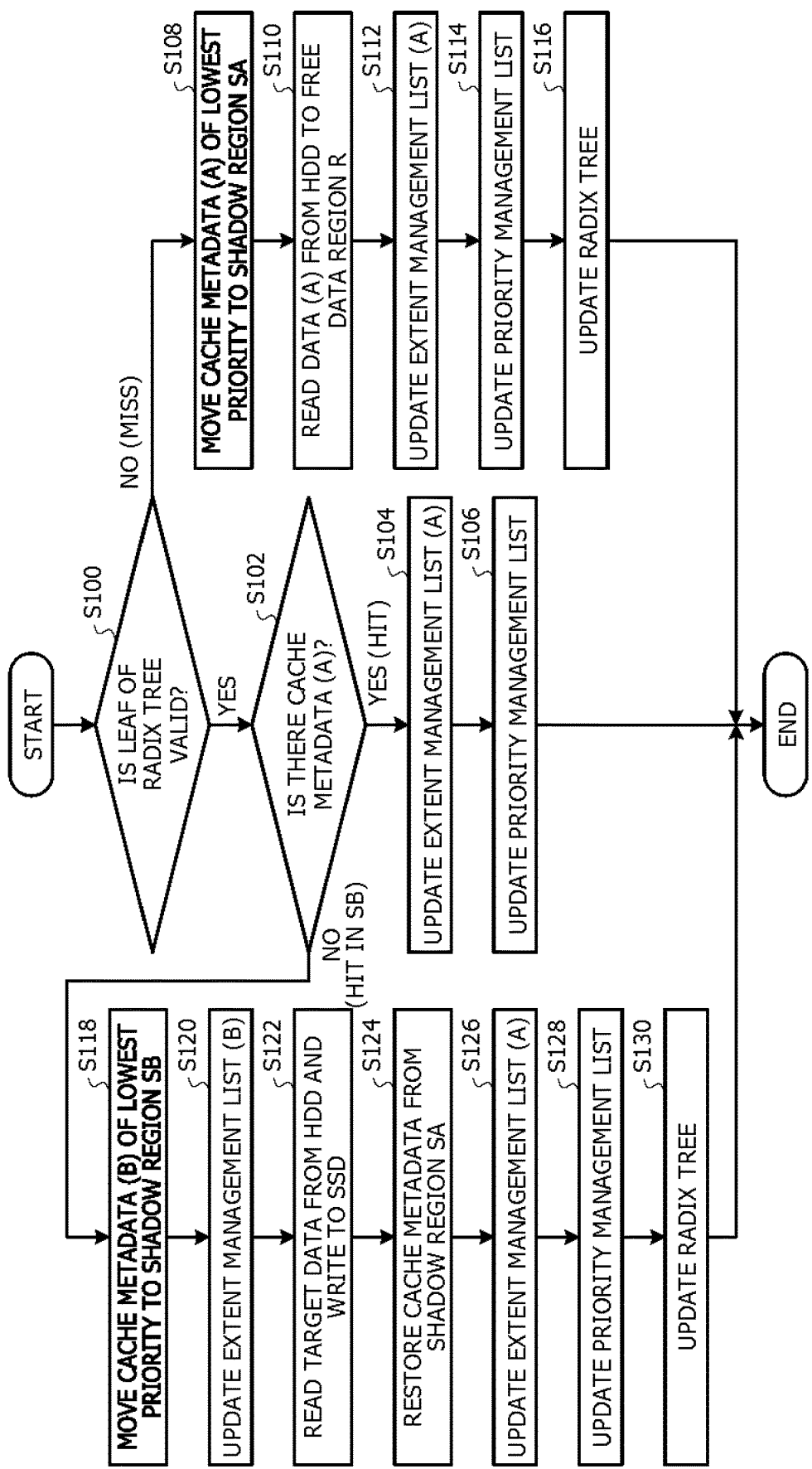
FIG. 14 is a flow diagram illustrating an example of an operation when receiving the access request from the process A in the computer in FIG. 9.

FIG. 14 illustrates an example of an operation when receiving the access request from the process A in the computer 10 in FIG. 9. In other words, for example, FIG. 14 illustrates an example of a control method of the computer implemented by a cache management program executed by the computer. FIG. 14 mainly illustrates an updating process of the cache management information. In FIG. 14, similarly to the description above, it is assumed that all the data regions R of the SSD 300 are used by the processes A and B half-and-half. Furthermore, it is assumed that each of the processes A and B issues only the read access request, and the access management unit 130A manages the priority by the LRU.

First, at step S100, the access management unit 130A determines whether the leaf of the radix tree 240 referred to by the block address included in the access request from the process A is valid. In other words, for example, the access management unit 130A determines whether it is possible to reach the leaf by tracing the radix tree 240. In a case where the leaf is reached and further an element of the leaf is not NULL, the procedure shifts to step S102 due to the cache hit or the hit of the shadow region SA. In a case where the leaf is not reached or NULL is hit, the procedure shifts to step S108 due to the cache miss.

At step S102, in a case where there is the cache metadata in any of the nodes NA of the extent management list 262, in other words, for example, in a case where the address indicated by the leaf is held as the cache metadata in any of the extents, the access management unit 130A determines the cache hit and the procedure shifts to step S104. In a case where there is no cache metadata in any of the nodes NA of the extent management list 262, the access management unit 130A determines that there is the cache metadata in the shadow region SA, and the procedure shifts to step S118.

At step S104, the access management unit 130A updates the priority of the node NA in the extent management list 262. Next, at step S106, the access management unit 130A updates the priority of the priority management list 264, and finishes the procedure illustrated in FIG. 14. Note that the access management unit 130A reads the access target data from the SSD 300 and responds to the process A.

On the other hand, in a case of the cache miss, at step S108, the access management unit 130A moves the cache metadata of the node NA of the lowest priority from the node NA to the shadow region SA, thereby vacating one of the data regions R of the SSD 300. Next, at step S110, the access management unit 130A reads target data from the HDD 400 in response to the access request (cache miss) from the process A and writes the read data to the free data region R of the SSD 300.

Next, at step S112, the access management unit 130A updates the priority of the node NA of the extent management list 262. Next, at step S114, the access management unit 130A updates the priority of the priority management list 264. Next, at step S116, the access management unit 130A updates the radix tree 240 on the basis of the updated extent management list 262 and priority management list 264, and finishes the procedure illustrated in FIG. 14.

On the other hand, at step S118, the access management unit 130A moves the cache metadata of the node NB of the lowest priority from the node NB to the shadow region SB. Next, at step S120, the access management unit 130A updates the priority of the node NB of the extent management list 262.

Next, at step S122, the access management unit 130A reads the target data from the HDD 400 in response to the access request from the process A that is hit in the shadow region SA, and writes the read data to the free data region R of the SSD 300.

At step S124, the access management unit 130A moves the cache metadata from the shadow region SA to the node NA corresponding to the data region R of the SSD 300 to which the data is written, thereby restoring the same. Next, at step S126, the access management unit 130A updates the priority of the node NA of the extent management list 262. Next, at step S128, the access management unit 130A updates the priority of the priority management list 264. Next, at step S130, the access management unit 130A updates the radix tree 240 on the basis of the updated extent management list 262 and priority management list 264, and finishes the procedure illustrated in FIG. 14.

Figure 15:
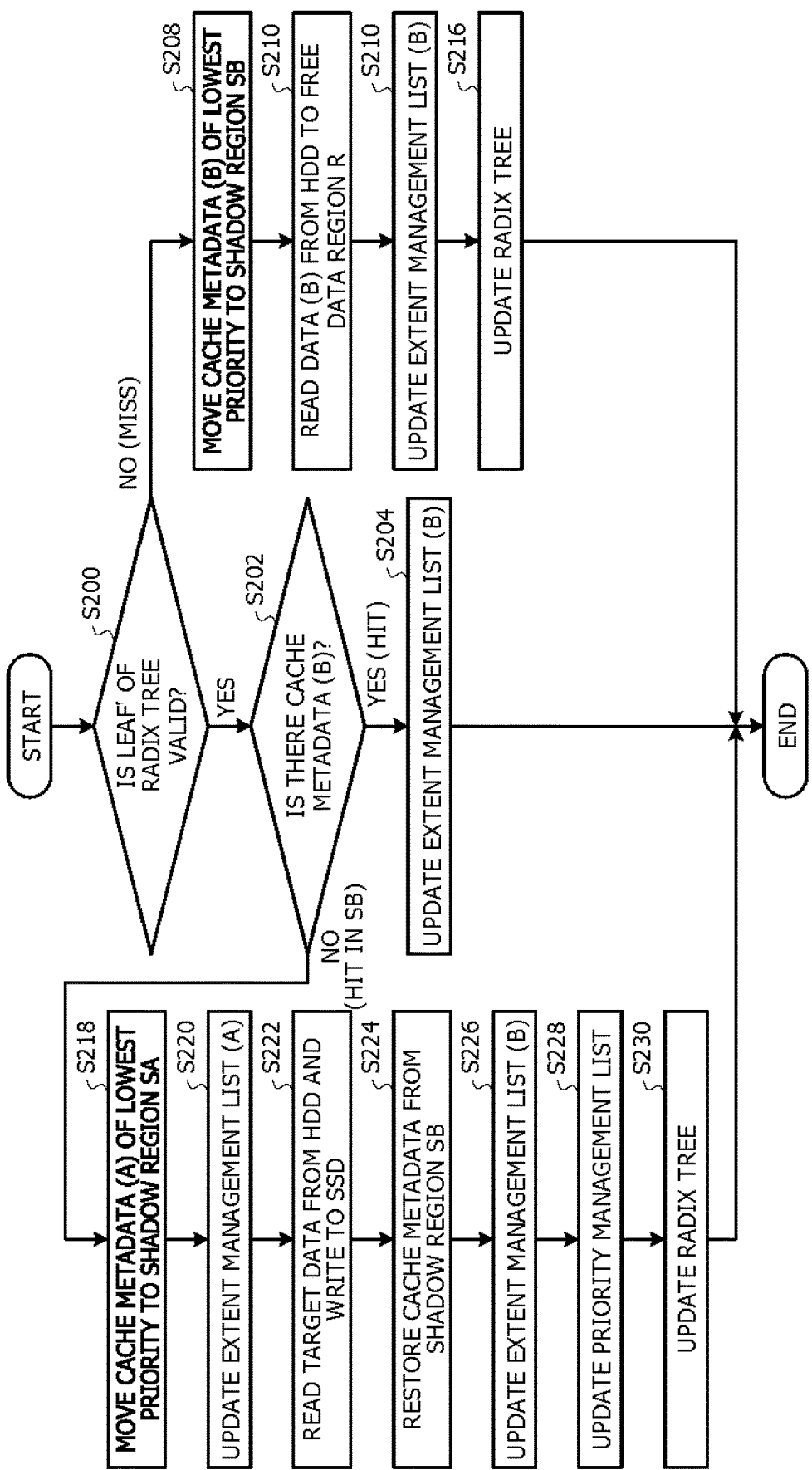
FIG. 15 is a flow diagram illustrating an example of an operation when receiving the access request from the process B in the computer in FIG. 9.

FIG. 15 illustrates an example of an operation when receiving the access request from the process B in the computer 10 in FIG. 9. In other words, for example, FIG. 15 illustrates an example of a control method of the computer implemented by a cache management program executed by the computer 10. FIG. 15 mainly illustrates an updating process of the cache management information. In FIG. 15, similarly to the description above, it is assumed that all the data regions R of the SSD 300 are used by the processes A and B half-and-half. Furthermore, it is assumed that each of the processes A and B issues only the read access request, and the access management unit 130A manages the priority by the LRU.

First, at step S200, the access management unit 130A determines whether the leaf' of the radix tree 240 referred to by the block address included in the access request from the process B is valid. In other words, for example, the access management unit 130A determines whether it is possible to reach the leaf' by tracing the radix tree 240. In a case where the leaf' is reached and further an element of the leaf is not NULL, the procedure shifts to step S202 due to the cache hit or the hit of the shadow region SB. In a case where the leaf' is not reached or NULL is hit, the procedure shifts to step S208 due to the cache miss.

At step S202, in a case where there is the cache metadata in any of the nodes NB of the extent management list 262, the access management unit 130A determines the cache hit, and the procedure shifts to step S204. In a case where there is no cache metadata in any of the nodes NB of the extent management list 262, the access management unit 130A determines that there is the cache metadata in the shadow region SB, and the procedure shifts to step S218.

At step S204, the access management unit 130A updates the priority of the node NB regarding the process B in the extent management list 262 and finishes the procedure illustrated in FIG. 15. Note that the access management unit 130A reads the access target data from the SSD 300 and responds to the process B.

On the other hand, in a case of the cache miss, at step S208, the access management unit 130A moves the cache metadata of the node NB of the lowest priority from the node NB to the shadow region SB, thereby vacating one of the data regions R of the SSD 300. Next, at step S210, the access management unit 130A reads target data from the HDD 400 in response to the access request (cache miss) from the process B and writes the read data to the free data region R of the SSD 300.

Next, at step S212, the access management unit 130A updates the priority of the node NB of the extent management list 262. Next, at step S216, the access management unit 130A updates the radix tree 240 on the basis of the updated extent management list 262, and finishes the procedure illustrated in FIG. 15.

On the other hand, at step S218, the access management unit 130A moves the cache metadata of the node NA of the lowest priority from the node NA to the shadow region SA. Next, at step S220, the access management unit 130A updates the priority of the node NA of the extent management list 262.

Next, at step S222, the access management unit 130A reads the target data from the HDD 400 in response to the access request from the process B that is hit in the shadow region SB, and writes the read data to the free data region R of the SSD 300.

At step S224, the access management unit 130A moves the cache metadata from the shadow region SB to the node NB corresponding to the data region R of the SSD 300 to which the data is written, thereby restoring the same. Next, at step S226, the access management unit 130A updates the priority of the node NB of the extent management list 262. Next, at step S228, the access management unit 130A updates the priority of the priority management list 264. Next, at step S230, the access management unit 130A updates the radix tree 240 on the basis of the updated extent management list 262 and priority management list 264, and finishes the procedure illustrated in FIG. 15.

As described above, in this embodiment also, effects similar to those of the above-described embodiment may be obtained. For example, in a case where the SSD 300 (cache) is shared by a plurality of processes A and B of different data sizes of the access requests, it is possible to dynamically change the allocation of the data regions R while avoiding conflict of the data regions R of the SSD 300.

Moreover, in this embodiment, in a case where the SSD 300 is shared by a plurality of processes A and B of block sizes different from each other using the shadow regions SA and SB, it is possible to suppress cache allocation by the extents from changing every time at the time of the cache miss. Therefore, it may be expected that the cache allocation more suitable for the access pattern is settled.

From the detailed description above, characteristics and advantages of the embodiments will become apparent. This intends that claims cover the characteristics and advantages of the embodiment described above without departing from the spirit and the scope of claims. Furthermore, one of ordinary knowledge in the technical field may easily achieve various improvements and modifications. Therefore, there is no intention to limit the scope of the inventive embodiments to those described above, and the scope of the inventive embodiment may rely on appropriate improvements and equivalents included in the scope disclosed in the embodiment.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A computer comprising:
a memory,
a cache coupled to the memory and holding a part of data stored in the memory in any of a plurality of data regions, the cache shared by a plurality of processes, and
a processor coupled to the memory and the cache and configured to:
execute the plurality of processes that issue access requests of different data sizes, respectively;
store data according to the data size for each of the plurality of processes in the cache;
access the cache in a case where target data of the access requests is present in the cache; and
change, in a case of replacing first data of a first data size held in the cache with second data of a second data size larger than the first data size, allocation of data regions of the cache in units of the second data size by referring to
a first management list that includes a plurality of first entries that correspond to the plurality of data regions, respectively, for managing priorities of the data regions for each of the plurality of processes, and
a second management list that includes a plurality of second entries corresponding to the first entries for a process that uses the first data size, for managing priorities of first data of the first data size held in the data regions.

2. The computer according to claim 1, wherein
the processor is further configured to evict, in a case of replacing the first data held in the cache with the second data, first data held in a data region of the second data size that includes the first data to be replaced from the cache.

3. The computer according to claim 1, wherein
the first entries for a process that uses the second data size hold position information of the data regions in which the second data are held together with the priorities of the data regions,
the first entries for the process that uses the first data size hold position information of the second entries of the second management list together with the priorities of the data regions, and
the second entries hold the position information of the first data held in the data regions together with the priorities of the first data.

4. The computer according to claim 1, wherein the processor is further configured to, in the case of replacing the first data held in the cache with the second data;

change a first entry of the lowest priority out of the first entries for the process that uses the first data size to a first entry for a process that uses the second data size; and make a priority of the changed first entry the highest out of the first entries for the process that uses the second data size.

5. The computer according to claim 1, wherein the processor is further configured to:

by referring to an eviction address list that holds addresses of the data evicted from the cache for each of the plurality of processes, in a case where an address registered in the eviction address list that corresponds to a process that uses the second data size is hit, store an address held in a first entry of the lowest priority out of the first entries for the process that uses the first data size in the eviction address list that corresponds to the process that uses the first data size; and change the first entry of the lowest priority to a first entry for the process that uses the second data size, and deletes the hit address from the eviction list.

6. A control method of a computer comprising a memory and a cache coupled to the memory, holding a part of data stored in the memory in any of a plurality of data regions and shared by a plurality of processes, wherein the control method comprising:

executing the plurality of processes that issue access requests of different data sizes, respectively;

storing data according to the data size for each of the plurality of processes in the cache;

accessing the cache in a case where target data of the access requests is present in the cache; and changing, in a case of replacing first data of a first data size held in the cache with second data of a second data size larger than the first data size, allocation of data regions of the cache in units of the second data size by referring to a first management list that includes a plurality of first entries that correspond to the plurality of data regions, respectively, for managing priorities of the data regions for each of the plurality of processes, and a second management list that includes a plurality of second entries corresponding to the first entries for a process that uses the first data size, for managing priorities of first data of the first data size held in the data regions.

* * * * *